(12) United States Patent
Constant et al.

(10) Patent No.: US 6,226,694 B1
(45) Date of Patent: *May 1, 2001

(54) ACHIEVING CONSISTENCY AND SYNCHRONIZATION AMONG MULTIPLE DATA STORES THAT COOPERATE WITHIN A SINGLE SYSTEM IN THE ABSENCE OF TRANSACTION MONITORING

(75) Inventors: Steven J. Constant; Toni Atkinson; Stephen C. Booth; James R. Greuel, all of Fort Collins; Paul H. Price, Loveland; Robert D. Schettler; Darren D. Smith, both of Fort Collins; John T. Ward, Loveland, all of CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,481

(22) Filed: Apr. 29, 1998

(51) Int. Cl.$^7$ ...................................................... G06F 1/12
(52) U.S. Cl. ............................................ 709/400; 711/141

(58) Field of Search .................................... 709/400, 300, 709/100, 102, 104, 105; 711/141; 707/203

(56) References Cited

U.S. PATENT DOCUMENTS

| | | | | |
|---|---|---|---|---|
| 4,369,494 | * | 1/1983 | Bienvenu et al. | 364/200 |
| 4,502,116 | * | 2/1985 | Fowler et al. | 364/200 |
| 5,239,641 | * | 8/1993 | Horst | 395/550 |
| 5,481,747 | * | 1/1996 | Kametani | 395/800 |
| 5,870,763 | * | 2/1999 | Lomet | 707/202 |
| 5,913,024 | * | 6/1999 | Green et al. | 395/186 |
| 6,021,473 | * | 2/2000 | Davis et al. | 711/141 |

\* cited by examiner

*Primary Examiner*—Robert Beausoleil
*Assistant Examiner*—Rita Ziemer (57) ABSTRACT

A system and method synchronizes multiple data stores and achieves data consistency in a non-transactional multiprocessing computer system. Processes are paused and later resumed according to their position in a dependency tree of the system. The data input sources of the system are in effect disabled and any data flow currently in progress in the system is flushed out the various data flow paths to the different data stores. When this process is complete, each of the multiple data stores is synchronized and the data is in a consistent state.

15 Claims, 7 Drawing Sheets

302: PAUSE PROCESSES WHICH ARE NOT INVOKED BY ANY OTHER PROCESS AND WHICH OPERATE AS A FIRST POINT OF SOURCE FOR RECEIVING DATA INPUT FROM ONE OR MORE DATA INPUT SOURCES

304: DETERMINE NEXT SET OF PROCESSES, WHICH INCLUDE THOSE UNPAUSED PROCESSES THAT ARE POTENTIALLY INVOKED BY ANY PAUSED PROCESS, BUT WHICH IS NOT POTENTIALLY INVOKED BY ANY AS-YET UNPAUSED PROCESS

306: PAUSE EACH PROCESS IN THE NEXT SET OF PROCESSES

308: REMAINING UNPAUSED PROCESSES?
YES → (back to 304)
NO → RESUME COMPLETE

ACHIEVING CONSISTENCY AND SYNCHRONIZATION AMONG MULTIPLE DATA STORES THAT COOPERATE WITHIN A SINGLE SYSTEM IN THE ABSENCE OF TRANSACTION MONITORING

FIELD OF THE INVENTION

The present invention pertains generally to the field of multiprocessing computer systems, and more particularly, to a system and method for achieving consistency and synchronization among multiple data stores in a single non-transactional processing system.

BACKGROUND OF THE INVENTION

A multiprocessing computer system executes multiple processes simultaneously. Each process performs a particular task, and the processes, taken as a whole, perform a larger task, called an application. These processes may be executing on a single central computer or may be running on separate computers which are connected to each other via a communication link, i.e., a distributed environment. Multiprocessing computer systems often include multiple data stores. Each data store is typically directly accessed by one or only a few of the multiple processes in the system.

In order for the applications to function correctly, the separate processes must be coordinated via inter-process communication. Inter-process communication is typically implemented as a message passing system, which is characterized by processes sending messages to, and receiving messages from, other processes. If a failure occurs in one of the processes, often the entire application must be reinitialized, because each process is dependent on the successful operation of the other processes. In such a case, each of the processes must be rolled back to the beginning of execution.

In a multiple data store multiprocessing system, the multiple data stores may be updated by system applications at different times. Accordingly, at any given time the various data stores may be in a state of inconsistency due to the fact that some of them have been updated to reflect the current progress of the application, and some have not (which reflects the portion of the application that has not yet completed). For some applications, data inconsistency is problematic. For example, a backup application requires the data in different data stores to be in a state that can support a functioning system when restored from the backup medium. To achieve this, the data stores must be in a consistent state during the backup.

Consistency and synchronization among multiple data stores is achieved in some prior art systems via transactional processing. In a transactional processing system, an application is made up of multiple "transactions". A transaction is a series of independent operations done in a specific sequence to accomplish a specific goal. A transaction does not complete until each operation in the transaction has completed. An operation may be performed in another process. Accordingly, if a process has invoked another process, the invoking process suspends until the invoked process completes. Thus, a transactional processing system guarantees that a set of operations is autonomous, i.e., the set of operations succeeds or fails as a group. Accordingly, if one of the operations included in the set of operations defined by a particular transaction fails, the entire transaction is easily rolled back to a consistent state by undoing each operation, in reverse order of invocation, in the reverse sequence in which it was performed.

In non-transactional multiprocessing systems, applications can perform "high-level operations" (HLOs). An HLO is defined as a series of tasks that are accomplished by using the services provided by a set of lower level processes. HLOs are similar to transactions in a transactional system in that a plurality of processes, each of which performs a lower-level task, are coordinated to accomplish a larger task. However, unlike a transaction, which sequences through a set of processes in a specific order, a reversal of the sequence of operations will not necessarily restore a consistent state among the multiple data stores of the system. Moreover, multiple HLOs may execute simultaneously and asynchronously, and no provision exists for keeping track of which HLO, and in what order each HLO, updated any given data store.

In non-transactional, multiple data store multiprocessing systems, a different approach to achieving consistency and synchronization among multiple data stores is required. In present day non-transactional multiple-data-store processing systems, synchronization and data consistency can only be achieved by shutting the entire system down. However, this approach, which results in loss of service and time, is inconvenient, and for some users, unacceptable. Accordingly, a need exists for a system and method for achieving synchronization and consistency among multiple data stores of a non-transactional processing system which allows the system to remain running, and which minimizes the loss of time and service to its users.

SUMMARY OF THE INVENTION

The present invention, which is a system and method for synchronizing multiple data stores and achieving data consistency in a non-transactional multiprocessing computer system, solves the problems of the prior art. In a system that includes multiple data stores, one or more data input sources, and multiple simultaneously executing processes included in a dependency tree comprising all processes that lie in a dependency path between at least one data input source and at least one data store, synchronization of data is accomplished as follows: A first subset of processes that lie in the dependency tree are paused. When a process pauses, it stops accepting service requests that result in modification of any of the data stores, completes all pending tasks that result in modification of any of the data stores, and flushes all internally-cached data to an unpaused process or to one or more of the data stores. The first subset includes all of the processes in the dependency tree that are not invoked by any other process in the dependency tree and which also receives data directly from at least one data input source. A succeeding subset of processes lying in the dependency tree are paused next. The succeeding subset includes at least one process that is invoked by an already paused process and that is not invoked by any as-yet unpaused process. As each process is paused, or alternatively, as each subset of processes are all paused, another succeeding subset of processes is selected based on the same criteria and then paused. This process continues until all of the processes in the dependency tree are paused. When all processes in the dependency tree are paused, the data in each of the multiple data stores is both synchronized and consistent.

Normal operation of the system is resumed by resuming each of the paused processes in the reverse order in which they were paused. A last subset of processes that lie in the dependency tree are resumed. The last subset includes all processes that lie in a dependency path that directly accesses at least one data store. A preceding subset of processes lying in the dependency tree are paused next. The preceding subset includes at least one process that invokes one or more already resumed processes and that does not invoke any currently paused processes. As each process is resumed, or alternatively, as each subset of processes are all resumed, another preceding subset of processes is selected based on the same criteria and then resumed. This process continues until all of the processes that lie in the dependency tree are resumed. A process resumes by beginning to accept service requests that result in modification of at least one of the data stores.

In systems that include indirect processes that cannot communicate with the synchronizing means, but that also lie in a dependency path between at least one data input source and at least one data store, a proxy process is provided to translate pause requests into proxy pause requests to which the indirect process responds.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION OF THE INVENTION

Figure 1:
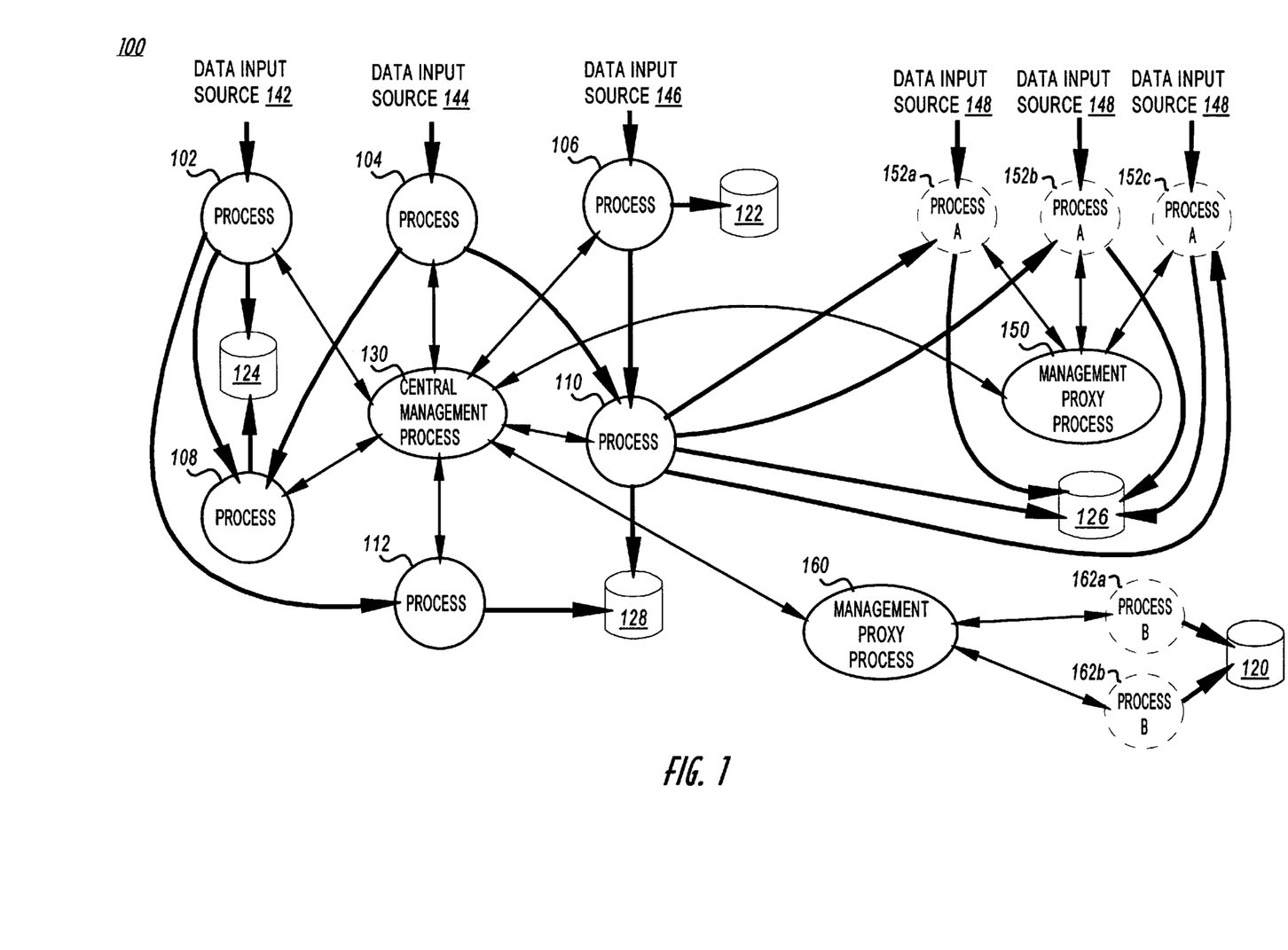
FIG. 1 is a block diagram of a non-transactional multiple-data-store processing system in accordance with the invention.

FIG. 1 is a block diagram of an illustrative example of a non-transactional multiple-data-store processing system 100. System 100 includes a plurality of processes 102, 104, 106, 108, 112, 130, 150, 152a, 152b, 152c, 160, 162a and 162b with various inter-dependencies among one another. Processes 102, 104, 106, 108, 112, 150, 152a, 152b, 152c, 160 162a and 162b execute simultaneously in the same or a distributed environment. System 100 also includes a plurality of data stores 120, 122, 124, 126, 128 that are directly accessed by only one or a small few of the plurality of processes. In the illustrative embodiment, data store 122 is directly accessed only by process 106; data store 124 is directly accessed only by process 102 and 108; data store 126 is directly accessed only by processes 110 and 152a, 152b, 152c; data store 128 is directly accessed only by processes 110 and 112; and data store 120 is directly accessed only by processes 162a and 162b.

In system 100, data is maintained in multiple independent, but related, data stores 120, 122, 124, 126, 128. No data replication is provided by the data stores 120–128. Furthermore, processes 102, 104, 106, 108, 112 operate autonomously such that no transaction control exists to synchronize operations among the individual processes.

System 100 includes a central management process 130, which is configured to understand the inter-dependencies among processes 102, 104, 106, 108, 112, 150 and 160. Central management process 130 includes means to pause and resume each of processes 102, 104, 106, 108, 112 in an order that complies with the inter-dependencies of each of the processes 102, 104, 106, 108, 112. This ensures that the different data stores are synchronized to maintain data consistency of each of data stores 120, 122, 124, 126, 128.

System 100 may include processes that modify data stores and or that require synchronization, but do not or cannot interact directly with central management process 130. These types of processes, hereinafter termed "indirect processes", are shown in system 100 as indirect processes 152a, 152b, 152c, 162a and 162b. Indirect processes are "indirect" because they implement a different communication protocol than that recognized by central management process 130. Processes 152a, 152b, and 152c are three separate instances of an identical process A. For example, processes 152a, 152b, and 152c may be the result of three different operators starting up separate instances of a user interface process. Likewise, process 162a and 162b are two separate instances of a different identical process B.

Because central management process 130 cannot communicate directly with indirect processes 152a, 152b, and 152c or 162a and 162b, management proxy process 150 and 160 are employed to interface between the central management process 130 and respective indirect processes 152a, 152b, 152c, 162a and 162b. Management proxy processes 150 and 160 translate "pause" notifications and "resume" notifications from central management process 130 into proxy "pause" notifications and proxy "resume" notifications using communication protocols that are recognized by respective indirect processes 152a, 152b, 152c, 162a and 162b.

Data may be flowing from multiple data input sources due to multiple simultaneously running asynchronous HLOs. As an example, consider that a system may receive user input as a source of changing the data stores, while simultaneously, the system may be capturing system events which result in a modification to one or more different data stores 120, 122, 124, 126, 128. Each of these data input sources 142, 144, 146 generate a flow of data through different paths (and therefore a different order of processes) in system 100.

Central management process 130 does not keep track of what is happening among the different processes 102, 104, 106, 108, 112 at any given time. However, central management process 130 is configured to keep track of which processes lie in a dependency path between an input data source and a data store, and also the ordered sequence that the data is manipulated in by the various processes in the dependency.

In the illustrative embodiment, this is accomplished by creating a dependency tree that is derived from process dependency declarations. Each process 102, 104, 106, 108, 112, 150 and 160 declares its dependency with respect to each of the other processes. The process designer understands the processes' relationship to other processes and other data stores in the system. The declared inter-dependencies of each process are stored in an inter-dependency configuration file. Central management process 130 reads the inter-dependency configuration file and mathematically creates a dependency tree that reflects the structure of the different processes of system 100.

As a result of the provided dependency tree, process 102 declares that it makes calls to processes 108 and 112; process 104 declares that it makes calls to processes 108 and 110;

process 106 declares that it makes calls to process 110; process 108 declares that it does not call any other process; process 110 declares that it makes calls to indirect processes 152a, 152b, and 152c; and process 112 declares that it does not invoke any other process; management proxy process 150 declares that it makes calls to indirect processes 152a, 152b, and 152c; and management proxy process 160 declares that it makes calls to indirect processes 162a and 162b.

Figure 2:
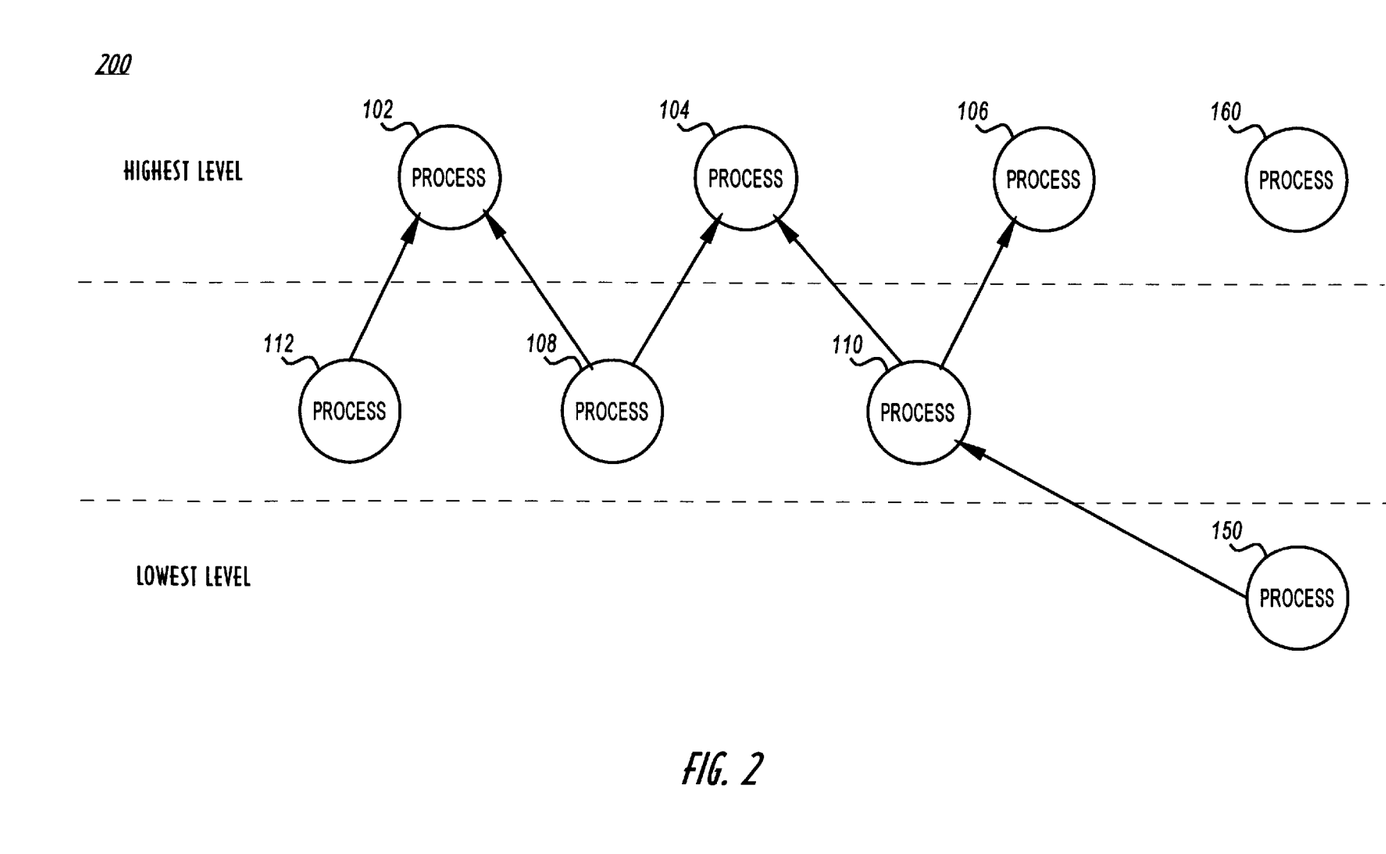
FIG. 2 is a dependency tree of the system of FIG. 1.

FIG. 2 is a dependency tree 200 illustrating the inter-dependencies among the different processes in system 100 that is created from the dependency declarations in processes 102–112, 150 and 160. Dependencies are in the direction of the arrows. Processes 152a, 152b, 152c, 162a and 162b are not included in FIG. 2 because they do not communicate directly with central management process 130. Process 110 depends on process 150 because process 110 depends on indirect processes 152a, 152b and 152c. Processes 106 and 104 each depend on process 110. Process 104 and 102 each depend on process 108. Process 102 depends on process 112. Processes 102, 104, 106 and 160 depend on no other processes.

In accordance with the invention, synchronization and data consistency are achieved by pausing and resuming processes 102, 104, 106, 108, 110, 112 and 150, 160 in an order which conforms to the defined inter-dependent relationships among the different processes (i.e., the level of the processes' position in dependency tree 200). The inter-dependencies among the different processes are the same regardless of what HLOs are being performed by system 100. The ordering of pauses and resumes are inherent in how the processes behave, which data stores each particular process modifies, which processes receive direct input from data input sources, and where each process resides in the dependency tree. Because central management process 130 understands the inter-dependencies of, and communicates with, each of processes 102, 104, 106, 108, 112, 150 and 160, it has the ability to control the order of pause operations of the different processes 102, 104, 106, 108, 110, 112, 150 and 160.

The "pause" operation of the invention is analogous to the stop operation in a transactional processing system. Accordingly, central management process 130 contacts each of the processes in the same order it would stop each process during a normal shutdown, and it tells them to do everything but stop. The order in which each process is paused is mapped directly to the order in which a stop would be ordered—that is, according to the defined process inter-dependencies.

When a proxy management process 150 or 160 receives a "pause" notification from central management process 130, it sends a proxy "pause" notification to each indirect process that it communicates with. Each management proxy process 150 and 160 understands the dependencies of its respective indirect processes, and pauses them in order of dependency. When an indirect process 152a, 152b and 152c or 162a and 162b receives a proxy "pause" notification, it pauses itself, if possible, and informs the respective management proxy process 150 or 160 of its pause success status. One reason that an indirect process may not be successful in performing a pause operation is if it has clients (i.e., other processes that potentially invoke it) that are unable to pause at the requested time. If any of an indirect process's clients are unable to pause at the requested time, the indirect process informs the appropriate management proxy process 150 or 160. Management proxy process 150 or 160 then responds to central management process 130. It is the responsibility of central management process 130 to issue a "resume" notification to any indirect processes that it directed to pause. Central management process 130 then responds to an unsuccessful pause by resuming any paused processes and then informing the HLO that requested the synchronization.

As will be appreciated by those skilled in the art, the invention essentially operates to cut off the data input sources into the system and to flush any current data flow in progress out the various data flow paths to the different data stores. When this process is complete, each of the multiple data stores is synchronized and the data is in a consistent state. The invention operates to guarantee consistency in any similarly modeled system regardless of its number of input data sources, different data flow paths, and process dependencies.

Figure 3:
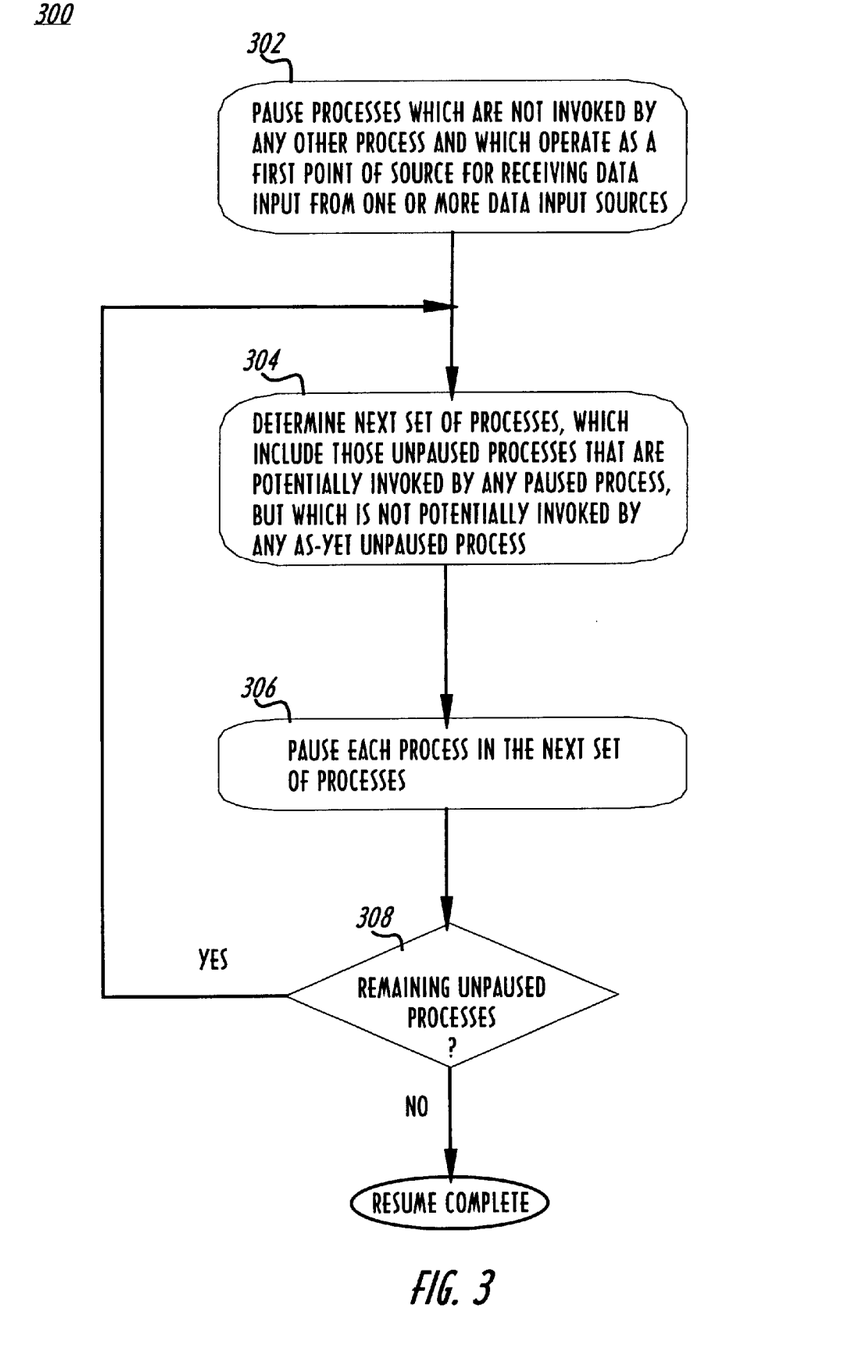
FIG. 3 is a flowchart of a method for pausing processes in a system in accordance with the invention.

FIG. 3 is a flowchart of the method 300 for pausing a plurality of processes which lie in the dependency paths of a system in accordance with the invention. Method 300 requires that each process which lies in the dependency tree to include means for receiving and acting upon a "pause" notification from the central management process 130. The details of what each process does after receiving the "pause" notification depends on the function of the particular process and can therefore vary from process to process. However, upon receiving a "pause" notification, each process must, at a minimum, stop accepting requests or commands for service that will result in a modification of a data store, complete all pending tasks that will modify a data store, and flush internally-cached data to the data store. Once a process has completed these steps (and whatever other steps the pause function of that particular process is designed to perform), the process notifies the central management process 130, via a "pause complete" response, that it has fulfilled the requirements of the "pause" notification. It is the responsibility of the central management process 130 to understand which processes in the system must be notified of the pending management operation, and in what order to notify them.

According to the method 300 of the invention, when the different data stores of a system must be synchronized, central management process 130, in step 302, pauses each process which lies in a dependency path and which is not invoked by any other such process and which operates as a first point of source in the system for receiving data input from at least one data input sources.

Once one or more of the processes is paused, central management process 130 determines, in step 304, a next subset of processes which includes those remaining unpaused processes that are potentially invoked by a paused process and that are not potentially invoked by any as yet unpaused process.

In step 306, central management process 130 pauses each of the next subset of processes. In step 308, the central management process 130 determines whether any process in the dependency tree remains unpaused. If not, method 300 is complete. Otherwise, steps 304 through 308 are repeated until each process in the dependency tree has been paused in proper order such that all data has been flushed to the different data stores.

Applying method 300 to system 100, the order in which processes 102, 104, 106, 108, 112, 150 and 160 are paused is as follows: pause processes 102, 104, 106 and 160; when process 102 responds to central management process 130, pause process 112; when both processes 102 and 104 have completed pausing and respond to central management process 130, pause process 108; when both processes 104 and 106 have completed pausing and respond to central management process 130, pause process 110; when process 110 has completed pausing and responds to central management process 130, pause process 150; when all "pause complete" responses have been received by central management process 130, the system is paused.

Figure 4:
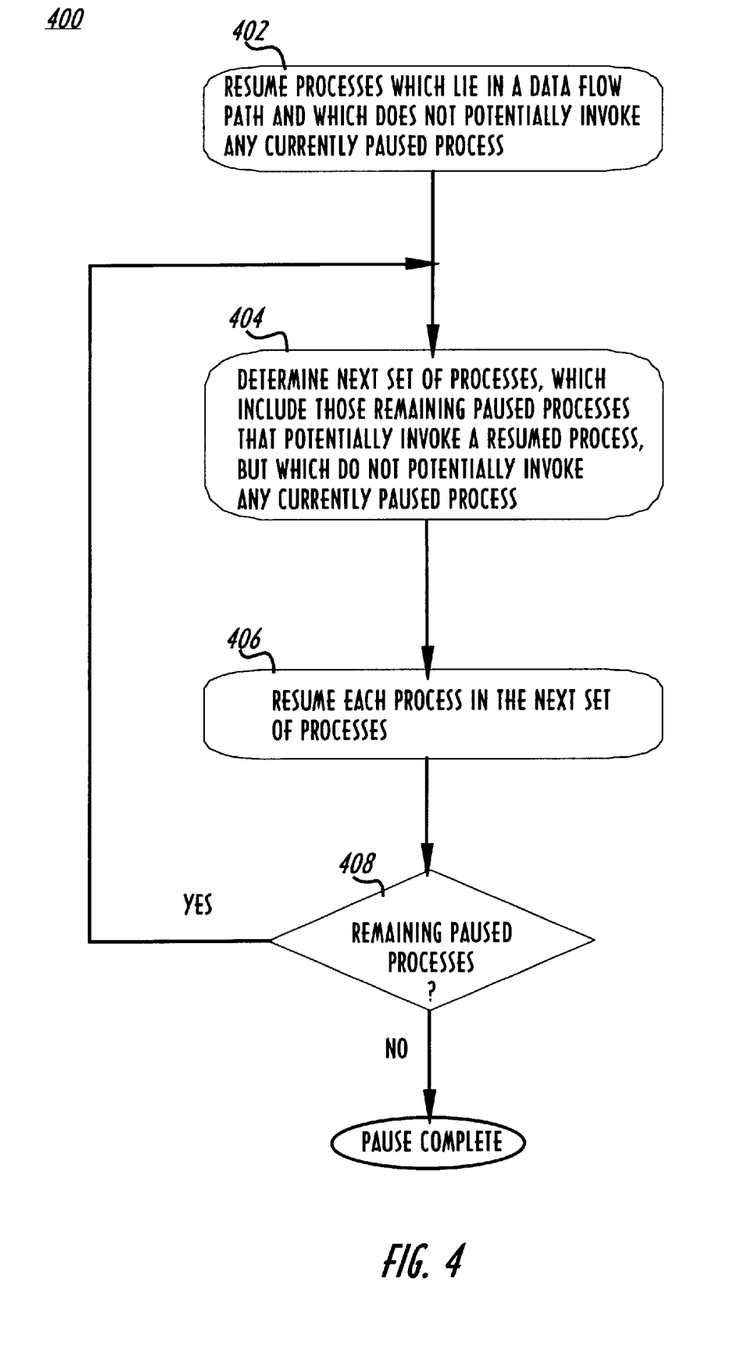
FIG. 4 is a flowchart of a method for resuming paused processes in a system in accordance with the invention.

FIG. 4 is a flowchart of a method 400 for resuming a plurality of paused processes which lie in the dependency tree of a system in accordance with the invention. Method 400 requires each process that lies in the dependency tree to include means for receiving and acting upon a "resume" notification from the central management process 130. Upon receiving a "resume" notification, the receiving process begins accepting and processing requests or commands for service. "Resume" notifications are sent out in the same order as "start" notifications, and the reverse order of "pause" notifications. Once a process has completed this step (and any other steps the process must complete in order to complete the process's resume function), the process notifies central management process 130 via a "resume complete" response. It is the responsibility of central management process 130 to understand which processes in the system 100, and in what order, to resume each of the processes. In the preferred embodiment, this is determined via the dependency tree.

According to method 400, when the different paused processes of a system are to be resumed, central management process 130 begins, in step 402, by resuming each process which does not invoke any currently paused ones of the processes in the dependency tree. This is accomplished by sending a "resume" notification to the lowest level processes in the dependency tree. Central management process 130 waits until it receives a "resume complete" response from at least one of these processes.

Once one or more of the processes located on the lowest level of the dependency tree is resumed, in step 404 the central management process 130 determines a next set of processes which includes those remaining paused processes that potentially invoke a resumed process and that do not potentially invoke any as yet paused process. In the illustrative embodiment, each process on the next level of the dependency tree is checked to determine whether each of the processes that it potentially invokes has returned a "resume complete" response.

In step 406, central management process 130 resumes each of the next set of processes. In the illustrative embodiment, this is accomplished by sending a "resume" notification to each of the next set of processes and waiting for a "resume complete" response.

In step 408, central management process 130 determines whether any process which lies in the dependency tree remains paused. If not, method 400 is complete and the system is resumed. Otherwise, steps 404 through 408 are repeated until each process which lies in the dependency tree has been resumed in proper order as defined by the dependency tree.

To resume normal operation, processes 102, 104, 106, 108, 112, 150 and 160 are resumed in reverse order with respect to paused order. Accordingly, resume processes 108, 112, 150 and 160; resume process 110 after process 150 has completed resuming; resume process 102 after process 112 and 108 have completed resuming; resume process 104 after process 108 and process 110 have completed resuming; resume process 106 after process 110 has completed resuming. When all "resume complete" responses have been received by central management process 130, the system is resumed.

Figure 5:
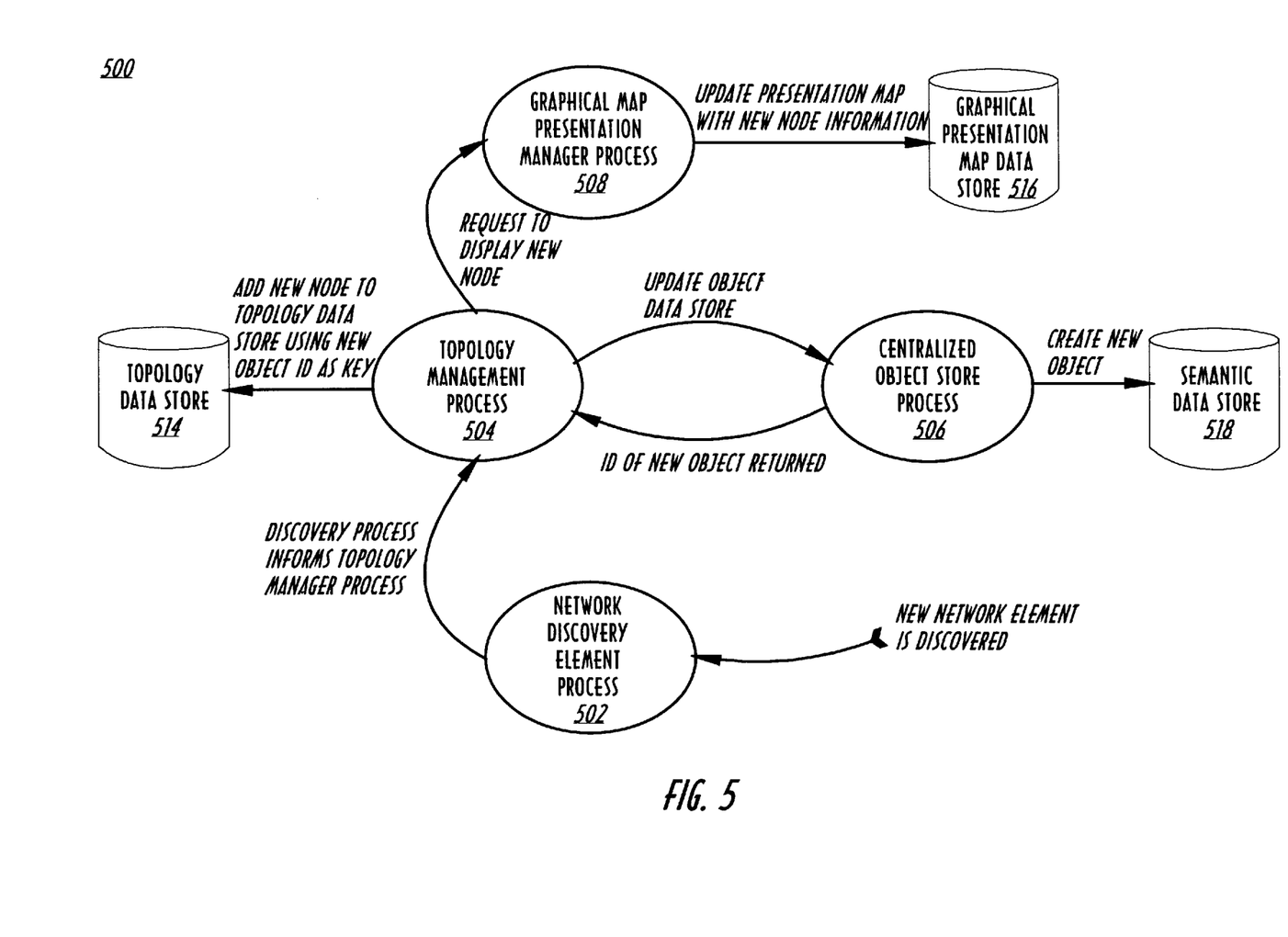
FIG. 5 is a block diagram of a system in accordance with the invention which illustrates the sequential flow of a high-level operation (HLO)

FIG. 5 is a block diagram of a network management system 500 which illustrates a specific example of the operation of the invention. System 500 includes a plurality of software processes, each designed to handle a specific part of an example "Discover_Network_Element" HLO, which discovers a new network element and adds it to a graphical map. System 500 includes a discovery manager process 502 for discovering new elements, a topology management process 504, a centralized object storage process 506 (i.e., a semantic information manager), and a graphical map presentation manager process 508 for displaying new elements. Discover_Network_Element HLO performs the following ordered sequence of operations: (1) discovery manager process 502 discovers new network element; (2) discovery manager process 502 informs topology manager process 504 about the new network element; (3) topology manager process 504 contacts central object store process 506 to update it with new information; (4) topology manager process 504 updates its own data store; (5) topology manager process 504 contacts presentation manager process 508 to add the new element to a graphical map; and (6) presentation manager process 508 updates its data store.

Network management system 500 is a non-transactional multiple-data-store processing system. Specifically, data is maintained in multiple independent, but related, data stores 514, 516, 518. Specifically, topology management process 504 maintains its own topology data store 514, centralized object store process 506 maintains its own semantic data store 518, and presentation manager process 508 maintains its own graphical map presentation data store 516. In this embodiment, high-level operations (HLOs) require updating the different multiple data stores 514, 516, 518 via APIs to the software processes 504, 506, 508, which control access to the respective data stores 514, 516, 518. Furthermore, processes 502, 504, 506, 508 operate autonomously such that no transaction control exists to synchronize operations among the individual processes. Finally data stores 514, 516, 518 provide no data replication (i.e., redundancy). In this environment, the tasks of Discover_Network_Element HLO flow through system 500 unchecked due to the absence of any overall transaction control. Furthermore, there may be multiple different HLOs flowing through system 500 simultaneously, each contacting its required set of processes (and potentially updating the different data stores 514, 516, 518). For example, a different "Add_New_Node" HLO (not shown) might allow an operator to add new nodes directly via the graphical map presentation manger process 508. Adding a node using this HLO results in a data flow path through system 500 in the opposite direction from what is described by the illustrated Discover_Network_Element HLO of FIG. 5.

Even though each process is independent of the others in the way that it manages data, dependencies exist among the data in the various data stores. For example, in network management system 500, a managed node is represented in topology data store 514, graphical map presentation data store 516, and semantic data store 518. The common key among the data stores is an object identifier, or name, as illustrated in FIG. 5. In this embodiment, the object ID binds the topology information, semantic information, and presentation information together. As new object data is added to network management system 500 (e.g., a new network node being added to network management system 500), topology management process 504 and graphical map presentation manager process 508 are contacted in a sequential order. Accordingly, as an HLO proceeds to completion, the various data stores 514, 516, 518 may be in a state of inconsistency due to the fact that some of them have been updated to reflect the existence of the new node, and some have not.

An example HLO which requires synchronized data is a backup HLO. Synchronization of data stores 514, 516, 518 is achieved by disallowing other HLOs, which invoke processes that lie in the dependency tree, to execute while the backup is in progress. All processes that lie in a dependency tree include means for receiving a "pause" notification, which informs them to prepare for synchronization. Once all processes have received and acted upon a "pause" notification, all the multiple data stores of the system are considered to be in a consistent state (i.e., there exist no broken dependencies among the multiple data stores), and therefore those data stores can be backed up.

Figure 6:
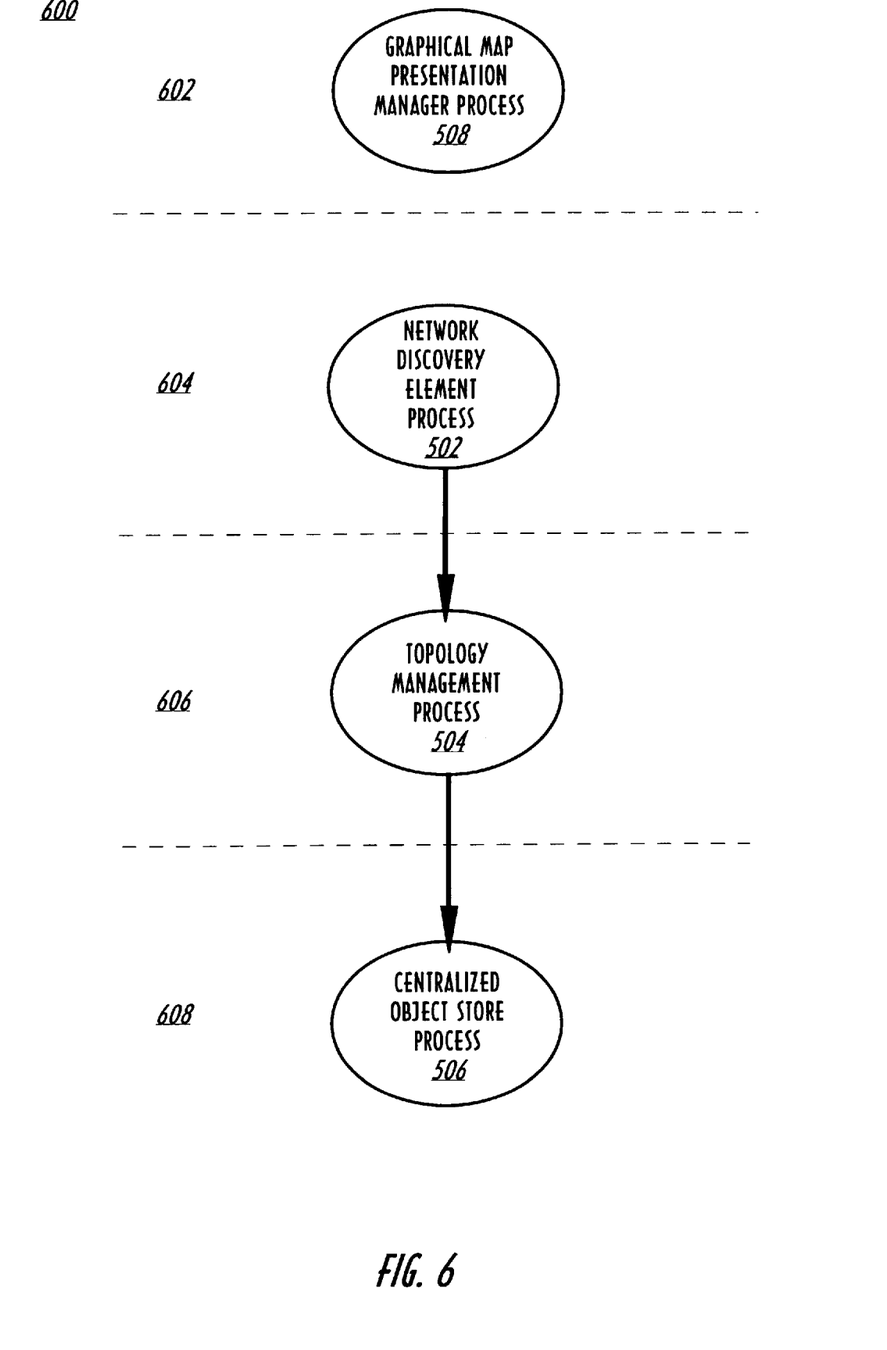
FIG. 6 is a dependency tree of the system of FIG. 5.

FIG. 6 is a dependency tree 600 of system 500. Graphical map presentation manager process 508 is an indirect process that does not communicate directly with a central management process 530 (shown in FIG. 7). In this example, a management proxy process 540 (also shown in FIG. 7) has supplied inter-dependency information about its client process (i.e., presentation manager process 508), which indicates that presentation manager process 508 is at the highest level 602 of the dependency tree 600 because no other processes in the dependency tree invokes it. Since network element discover process 502 is the only direct process in system 500 which directly receives data input from a data input source, discovery process 502 is located at the next level 604 of the dependency tree 600. Since topology management process 504 is the only process that receives requests from discover process 502, it resides at the next level 606 in the dependency tree 600. Finally, since centralized object store process 506 is the only process remaining that receives requests from topology management process 504, it resides at the next level 608 in the dependency tree 600.

Figure 7:
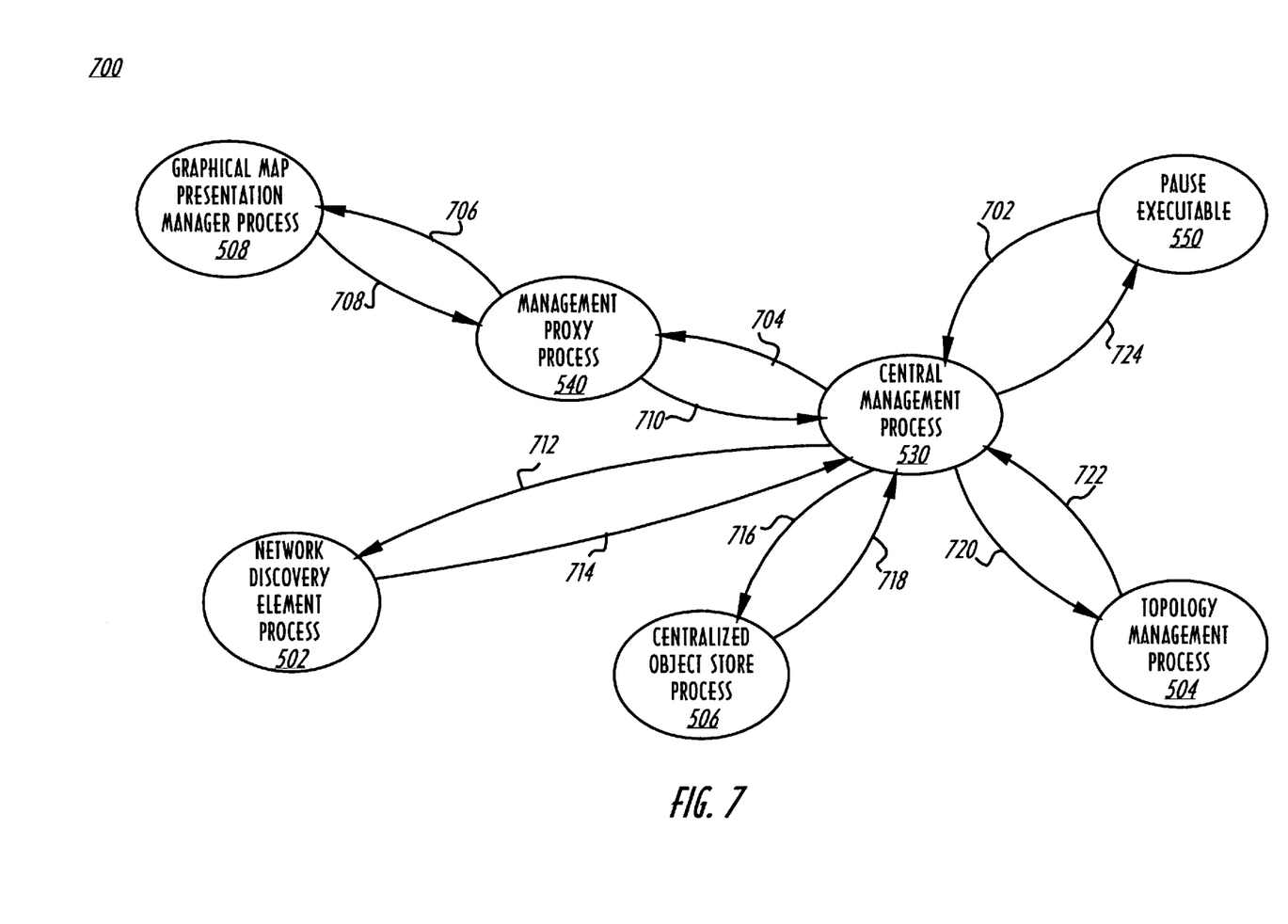
FIG. 7 is a flow diagram illustrating the order of pause notifications through the system of FIG. 5.

FIG. 7 is a flow diagram illustrating the order of "pause" notifications through system 700 for synchronizing the data in each of the different data stores 514, 516, 518 in FIG. 5. System 700 includes central management process 530 which understands the dependencies between processes 502, 504, 506, 508 of the system such that it can start, stop, pause, and resume the processes in an order that ensures data consistency is maintained. System 700 also includes management proxy process 540. Since presentation manager process 508 is at the highest level 602 of dependency tree 600, it must be paused first via management proxy process 540 to ensure that any client processes of presentation manager process 508 are in a pausable state at the requested time.

The method for synchronizing the data in data stores 514, 516, 518 begins with a first step 702 in which a pause executable 550 of a process which requires synchronized data requests that central management process 530 begin notifying processes to prepare for synchronization. In step 704, central management process 530 sends a "pause" notification to management proxy process 540. In step 706, management proxy process 540 then forwards a proxy "pause" notification to each of its client processes (not shown). In practice, there may be multiple instances of a process type (such as the graphical map presentation process 508). There may also be many different types of management proxy processes 540 in a system, each tuned to proxy for a specific type of client (e.g., Graphical User Interfaces (GUIs), or SNMP agents). The purpose of management proxy process 540 is to support processes that do not communicate with central management process 530. Management proxy process 540 receives commands from central management process 530 with a defined protocol, then communicates with its client processes (i.e., presentation process 508) using a protocol (e.g., API) that they understand. In step 708, graphical map presentation process 508 prepares for synchronization by flushing any pending map changes to its data store 518. Once its pause function is complete, presentation process 508 responds to management proxy process 540 with a proxy "pause complete" response. Any process that receives a proxy "pause" notification can return a negative acknowledgement back to the management proxy process 540, in which case, central management process 530 aborts the entire pause operation by sending a "resume" notification to all processes.

If management proxy process 540 receives a positive acknowledgement (i.e., a proxy "pause complete" response) from presentation process 508, it returns a "pause complete" response to central management process 530 in step 710. Central management process 530 then sends a "pause" notification to all other processes according to the order defined by the dependency tree 600. Accordingly, in step 712, central management process 530 sends a "pause" notification to discovery process 502 and receives a "pause complete" response in step 714. Central management process 530 then sends a "pause" notification to centralized object store process 506 in step 716 and receives a "pause complete" response in step 718. In step 720, central management process 530 sends a "pause" notification to topology management process 504, and receives a "pause complete" response in step 722. Once the central management process 530 has contacted each process and has received a "pause complete" response from each process, the central management process 530 returns, in step 724, a "system paused" message to the pause executable 550 indicating that the system, and all of its data, is now in a consistent state.

It will be appreciated by those skilled in the art that the present invention does not limit the number of levels that a "pause" notification or "resume" notification may travel. The present invention describes an N-level pause/resume hierarchy, where each level provides a mechanism to forward messages and receive responses to and from the next level. For example, the graphical map presentation process 508 described herein may support communication with other applications that, through an API, can augment the map. It may be necessary for these applications to also receive the proxy "pause" notification so that they can prepare for synchronization (i.e., the applications may be storing map changes in memory where those changes should be sent to graphical map presentation process 508 prior to the synchronization). In this example, the graphical map presentation process 508 would forward the "pause" notification to any applications that are connected. Thus, graphical map presentation process 508 determines its ability to comply with a "pause" notification in large part by the ability of its clients to comply.

Once all processes have been notified to pause and have all responded back to central management process 530, operations such as backup or data check pointing can be performed. After the completion of such operations, it is the responsibility of central management process 530 to inform the paused processes to resume normal operations. It does this by sending a "resume" notification to those processes in the reverse order that it sends "startup" notifications.

The system and method for synchronizing multiple data stores in a non-transactional processing has been described in detail above. Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for synchronizing multiple data stores and achieving data consistency in a non-transactional multiprocessing computer system, said system comprising a plurality of data stores, one or more data input sources, and a plurality of processes that lie in a dependency path between at least one of said one or more data input sources and at least one of said plurality of data stores, at least one of said plurality of processes having a data dependency on at least one other of said plurality of processes, said method comprising the steps of:

(a) pausing a first subset of said plurality of processes to flush all data from said first subset of processes to one or more of said data stores or to one or more unpaused processes, said first subset comprising each process of said plurality of processes that is not invoked by any other of said plurality of processes and which receives data directly from at least one of said one or more data input sources;

(b) pausing a succeeding subset of said plurality of processes to flush all data from said succeeding subset of processes to one or more of said data stores or to one or more unpaused processes, said succeeding subset comprising at least one process of said plurality of processes that is invoked by a paused process and that is not invoked by any unpaused ones of said plurality of processes; and (c) repeating step (b) until each of said plurality of processes remains unpaused.

2. A method in accordance with claim 1, wherein:

each said process of said first subset and said succeeding subset of said plurality of processes pauses by performing the steps of:

(d) stopping acceptance of service requests that result in modification of any of said plurality of data stores;

(e) completing all pending tasks that result in modification of any of said plurality of data stores; and (f) flushing all internally-cached data to an unpaused process or one or more of said plurality of data stores.

3. A method in accordance with claim 1, comprising:

(g) resuming a last subset of said plurality of processes, said last subset comprising each process of said plurality of processes that does not invoke any currently paused ones of said plurality of processes;

(h) resuming a preceding subset of said plurality of processes, said preceding subset comprising at least one process of said plurality of processes that invokes one or more resumed ones of said plurality of processes and does not invoke any currently paused ones of said plurality of processes; and (i) repeating step (h) if any of said plurality of processes remains unresumed.

4. A method in accordance with claim 3, wherein:

each said process of said last subset and said preceding subset of said plurality of processes resumes by performing the steps of:

(j) allowing acceptance of service requests that result in modification of at least one of said plurality of data stores.

5. A method in accordance with claim 4, wherein:

each said process of said first subset and said succeeding subset of said plurality of processes pauses by performing the steps of:

(k) stopping acceptance of service requests that result in modification of any of said plurality of data stores;

(l) completing all pending tasks that result in modification of any of said plurality of data stores; and (m) flushing all internally-cached data to an unpaused process or one or more of said plurality of data stores.

6. A non-transactional multiple-data-store processing system, comprising:

a plurality of data stores;

one or more data input sources;

a plurality of processes that lie in a dependency path between at least one of said one or more data input sources and at least one of said plurality of data stores, at least one of said plurality of processes having a data dependency on at least one other of said plurality of processes, each process of said plurality of processes comprising pausing means for stopping acceptance of service requests that result in modification of said plurality of data stores, completing all pending tasks that result in a modification of said plurality of data stores, and flushing all internally-cached data to either an unpaused one of said plurality of processes or to one or more of said plurality of data stores; and a central management process operable to pause each of said plurality of processes, in order, by pausing a first subset of said plurality of processes to flush all data from said first subset of processes to one or more of said data stores or to one or more unpaused processes, said first subset comprising each process of said plurality of processes that is not invoked by any other of said plurality of processes and which receives data directly from at least one of said one or more data input sources; and iteratively pausing a succeeding subset of said plurality of processes to flush all data from said succeeding subset of processes to one or more of said data stores or to one or more unpaused processes, said succeeding subset comprising at least one process of said plurality of processes that is invoked by a paused one of said plurality of processes and that is not invoked by any unpaused ones of said plurality of processes until none of said plurality of processes remains unpaused.

7. A system in accordance with claim 6, wherein:

each process of said plurality of processes comprises resuming means for allowing acceptance of service requests that result in modification of one or more of said plurality of data stores.

8. A system in accordance with claim 7, wherein:

said synchronizing means is operable to resume each process of said plurality of processes, in order, by resuming a last subset of processes of said plurality of processes, said last subset comprising each of said plurality of processes that does not invoke any currently paused ones of said plurality of processes; and by iteratively resuming a preceding subset of said plurality of processes, said preceding subset comprising at least one of said plurality of processes that invokes one or more resumed ones of said plurality of processes and does not invoke any paused ones of said plurality of processes, until none of said plurality of processes remains paused.

9. A system in accordance with claim 6, comprising:

an indirect process that lies in a dependency path between at least one of said one or more data input sources and at least one of said plurality of data stores, said indirect process being responsive to a proxy process to stop acceptance of service requests that result in modification of said plurality of data stores and to flush all internally-cached data to either an unpaused one of said plurality of processes or to one or more of said plurality of data stores; and a proxy process that is responsive to a pause request by generating and sending a proxy pause request to said indirect process.

wherein said synchronizing means sends a pause request to said proxy process when said indirect process is to be paused.

10. A system in accordance with claim 9, wherein:

said indirect process interacts with one or more client processes and performs a pause in response to a proxy pause request only if said one or more client processes are currently pausable when said proxy pause request is received.

11. A synchronizing process for synchronizing a plurality of data stores in a non-transactional multiple-data-store processing system comprising a plurality of data stores, one or more data input sources, and a plurality of processes that lie in a dependency path between at least one of said one or more data input sources and at least one of said plurality of data stores, at least one of said plurality of processes having a data dependency on at least one other of said plurality of processes, each of said plurality of processes comprising pausing means for stopping acceptance of service requests that result in modification of said plurality of data stores, completing all pending tasks that result in a modification of said plurality of data stores, and flushing all internally-cached data to either an unpaused one of said plurality of processes or to one or more of said plurality of data stores, said synchronizing process comprising:

a pause function responsive to a pause request to pause each of said plurality of processes, in order, by pausing a first subset of said plurality of processes to flush all data from said first subset of processes to one or more of said data stores or to one or more unpaused processes, said first subset comprising each process of said plurality of processes that is not invoked by any other of said plurality of processes and which receives data directly from at least one of said one or more data input sources; and iteratively pausing a succeeding subset of said plurality of processes to flush all data from said succeeding subset of processes to one or more of said data stores or to one or more unpaused processes, said succeeding subset comprising at least one process of said plurality of processes that is invoked by a paused one of said plurality of processes and that is not invoked by any unpaused ones of said plurality of processes until none of said plurality of processes remains unpaused.

12. A synchronizing process in accordance with claim 11, comprising:

a proxy process responsive to said pause function which generates and sends a proxy pause request to an indirect process that lies in a dependency path between at least one of said one or more data input sources and at least one of said plurality of data stores, said indirect process being responsive to said proxy process to stop acceptance of service requests that result in modification of said plurality of data stores and to flush all internally-cached data to either an unpaused one of said plurality of processes or to one or more of said plurality of data stores.

13. A synchronizing process in accordance with claim 11, comprising:

a resume function operable to resume each process of said plurality of processes, in order, by resuming a last subset of processes of said plurality of processes, said last subset comprising each of said plurality of processes that does not invoke any currently paused ones of said plurality of processes; and by iteratively resuming a preceding subset of said plurality of processes, said preceding subset comprising at least one of said plurality of processes that invokes one or more resumed ones of said plurality of processes and does not invoke any paused ones of said plurality of processes, until none of said plurality of processes remains paused.

14. A synchronizing process in accordance with claim 13, comprising:

a proxy process responsive to said resume function which generates and sends a proxy resume request to an indirect process that lies in a dependency path between at least one of said one or more data input sources and at least one of said plurality of data stores, said indirect process being responsive to said proxy process to resume acceptance of service requests that result in modification of said plurality of data stores.

15. A synchronizing process in accordance with claim 14, comprising:

a proxy process responsive to said pause function which generates and sends a proxy pause request to an indirect process that lies in a dependency path between at least one of said one or more data input sources and at least one of said plurality of data stores, said indirect process being responsive to said proxy process to stop acceptance of service requests that result in modification of said plurality of data stores and to flush all internally-cached data to either an unpaused one of said plurality of processes or to one or more of said plurality of data stores.

* * * * *